US012711720B2

(12) United States Patent
Ali Akbarian et al.

(10) Patent No.: US 12,711,720 B2
(45) Date of Patent: Aug. 18, 2026

(54) UPDATING POSE OF AN ARTICULATED OBJECT

(71) Applicant: Microsoft Technology Licensing, LLC, Redmond, WA (US)

(72) Inventors: Mohammand Sadegh Ali Akbarian, Cambridge (GB); Tadas Baltrusaitis, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 18/403,709

(22) Filed: Jan. 3, 2024

(65) Prior Publication Data

US 2024/0265659 A1 Aug. 8, 2024

Related U.S. Application Data

(63) Continuation-in-part of application No. 18/164,391, filed on Feb. 3, 2023.

(51) Int. Cl.
*G06T 19/20* (2011.01)
*G06T 7/73* (2017.01)

(52) U.S. Cl.
CPC ................ *G06T 19/20* (2013.01); *G06T 7/73* (2017.01); *G06T 2200/24* (2013.01); *G06T 2207/20081* (2013.01); *G06T 2207/20084* (2013.01); *G06T 2219/2004* (2013.01); *G06T 2219/2021* (2013.01)

(58) Field of Classification Search
CPC ....... G06T 19/20; G06T 7/73; G06T 2200/24; G06T 2207/20081; G06T 2207/20084; G06T 2219/2004; G06T 2219/2021; G06T 13/40; G06V 10/765; G06V 10/82; G06V 10/62; G06V 40/23
See application file for complete search history.

(56) References Cited

U.S. PATENT DOCUMENTS

2018/0060666 A1 3/2018 Song et al.
2020/0175713 A1 6/2020 Pescaru
(Continued)

FOREIGN PATENT DOCUMENTS

KR 20140094714 A * 7/2014 ........... G06F 3/0484
WO WO-2022197367 A1 * 9/2022

OTHER PUBLICATIONS

Final Office Action mailed on Oct. 2, 2025, in U.S. Appl. No. 18/164,391 17 pages.
(Continued)

*Primary Examiner* — Stephen G Sherman
(74) *Attorney, Agent, or Firm* — Barta Jones, PLLC

(57) ABSTRACT

A method of updating a pose of a plurality of joints of a kinematic tree of an articulated object is described. The method comprises receiving, for each of the joints in the kinematic tree, an initial pose. A single first embedding vector is computed by encoding the initial poses in an embedding space. For each of some but not all of the joints in the kinematic tree, a target pose is received. A single second embedding vector representing the target poses is computed in the embedding space. The first embedding vector is modified using the second embedding vector to form a third embedding vector. Decoding the third embedding vector produces the updated pose of the articulated object.

20 Claims, 7 Drawing Sheets

(56) References Cited

U.S. PATENT DOCUMENTS

| | | | | |
|---|---|---|---|---|
| 2022/0121878 | A1* | 4/2022 | Butler | G06V 10/751 |
| 2022/0301304 | A1* | 9/2022 | Hampali | G06N 3/045 |
| 2022/0414974 | A1* | 12/2022 | Zakharov | G06T 7/50 |
| 2023/0274492 | A1* | 8/2023 | Chen | G06T 17/00 345/419 |
| 2023/0282031 | A1 | 9/2023 | Ali Akbarian | |
| 2024/0054671 | A1* | 2/2024 | Oreshkin | G06V 10/44 |
| 2024/0264658 | A1 | 8/2024 | Ali Akbarian | |

OTHER PUBLICATIONS

"Final IK", Retrieved from: https://web.archive.org/web/20210117200134/https://assetstore.unity.com/packages/tools/animation/final-ik-14290, Jan. 17, 2021, 4 Pages.

Ahuja, et al., "CoolMoves: User Motion Accentuation in Virtual Reality", In Proceedings of the ACM on Interactive, Mobile, Wearable and Ubiquitous Technologies, vol. 5, No. 2, Jun. 24, 2021, 23 Pages.

Aliakbarian, et al., "FLAG: Flow-based 3D Avatar Generation from Sparse Observations", In Proceedings of the IEEE/CVF Conference on Computer Vision and Pattern Recognition, Jun. 18, 2022, pp. 13253-13262.

Barron, Jonathan T., "A General and Adaptive Robust Loss Function", In Proceedings of the IEEE/CVF Conference on Computer Vision and Pattern Recognition, Jun. 16, 2019, pp. 4331-4339.

Biggs, et al., "3D Multi-bodies: Fitting Sets of Plausible 3D Human Models to Ambiguous Image Data", In Proceedings of Advances in Neural Information Processing Systems, vol. 33, 2020, 12 Pages.

Bogo, et al., "Keep It SMPL: Automatic Estimation of 3D Human Pose and Shape from a Single Image", In Proceedings of 14th European Conference on Computer Vision, Oct. 11, 2016, pp. 561-578.

Buttner, Michael, "[Nucl.ai 2015] Motion Matching—The Road to Next Gen Animation", Retrieved from: https://www.youtube.com/watch?v=z_wpgHFSWss, Aug. 7, 2018, 2 Pages.

Cho, et al., "On the Properties of Neural Machine Translation: Encoder-Decoder Approaches", In repository of arXiv:1409.1259v1, Sep. 3, 2014, 9 Pages.

Choutas, et al., "Learning to Fit Morphable Models", In Repository of arXiv:2111.14824v1, Nov. 29, 2021, 14 Pages.

Dittadi, et al., "Full-Body Motion from a Single Head-Mounted Device: Generating SMPL Poses from Partial Observations", In Proceedings of the IEEE/CVF International Conference on Computer Vision (ICCV), Oct. 11, 2021, pp. 11687-11697.

Dosovitskiy, et al., "An Image is Worth 16×16 Words: Transformers for Image Recognition at Scale", In Repository of arXiv:2010.11929v1, Oct. 22, 2020, 21 Pages.

Ghorbani, et al., "SOMA: Solving Optical Marker-Based MoCap Automatically", In Proceedings of the IEEE/CVF International Conference on Computer Vision, Oct. 11, 2021, pp. 11117-11126.

He, et al., "Masked Autoencoders are Scalable Vision Learners", In Proceedings of the IEEE/CVF Conference on Computer Vision and Pattern Recognition, Jun. 19, 2022, pp. 16000-16009.

Holden, et al., "Learned Motion Matching", In Journal of ACM Transactions on Graphics, vol. 39, No. 4, Article 1, Jul. 2020, 13 Pages.

Huang, et al., "Deep Inertial Poser: Learning to Reconstruct Human Pose from Sparse Inertial Measurements in Real Time", In Journal of ACM Transactions on Graphics, vol. 37, No. 6, Article 185, Nov. 2018, 15 Pages.

Jiang, et al., "AvatarPoser: Articulated Full-Body Pose Tracking from Sparse Motion Sensing", In Proceedings of 17th European Conference Computer Vision, Oct. 23, 2022, pp. 443-460.

Kingma, et al., "ADAM: A Method for Stochastic Optimization", In arXiv:1412.6980v9, Jan. 30, 2017, 15 Pages.

Kingma, et al., "Auto-Encoding Variational Bayes", In arXiv:1312.6114v9, Apr. 10, 2014, 14 Pages.

Kolotouros, et al., "Probabilistic Modeling for Human Mesh Recovery", In Proceedings of the IEEE/CVF Intenational Conference on Computer Vision, Oct. 11, 2021, pp. 11605-11614.

Liu, et al., "On the Limited Memory BFGS Method for Large Scale Optimization", In Journal of Mathematical Programming, vol. 45, No. 3, Aug. 1989, pp. 503-528.

Loper, et al., "MoSh: Motion and Shape Capture from Sparse Markers", In Journal of ACM Transactions on Graphics, vol. 33, No. 6, Article 220, Nov. 19, 2014, 13 Pages.

Loper, et al., "SMPL: A Skinned Multi-Person Linear Model", In Journal of ACM Transactions on Graphics, vol. 34, No. 6, Article 248, Nov. 2, 2015, 16 Pages.

Mahmood, et al., "AMASS: Archive of Motion Capture as Surface Shapes", In Proceedings of the IEEE/CVF International Conference on Computer Vision, Oct. 27, 2019, pp. 5442-5451.

Marcard, et al., "Sparse Inertial Poser: Automatic 3D Human Pose Estimation from Sparse IMUs", In Proceedings of Computer graphics forum, vol. 36, No. 2, May 23, 2017, pp. 349-360.

Nocedal, et al., "Numerical Optimization", In Publication of Springer, Jul. 27, 2006, 686 Pages.

Pavlakos, et al., "Expressive Body Capture: 3D Hands, Face, and Body from a Single Image", In Proceedings of the IEEE/CVF Conference on Computer Vision and Pattern Recognition, Jun. 16, 2019, pp. 10975-10985.

Ponton, et al., "Combining Motion Matching and Orientation Prediction to Animate Avatars for Consumer-Grade VR Devices", In ACM SIGGRAPH/Eurographic Symposium on Computer Animation, vol. 41, No. 8, Sep. 23, 2022, 12 Pages.

Saito, et al., "PIFuHD: Multi-Level Pixel-Aligned Implicit Function for High-Resolution 3D Human Digitization", In Proceedings of the IEEE/CVF Conference on Computer Vision and Pattern Recognition (CVPR), Jun. 13, 2020, pp. 84-93.

Saleh, et al., "Probabilistic Tracklet Scoring and Inpainting for Multiple Object Tracking", In Proceedings of the IEEE/CVF Conference on Computer Vision and Pattern Recognition (CVPR), Jun. 19, 2021, pp. 14329-14339.

Ungureanu, et al., "HoloLens 2 Research Mode as a Tool for Computer Vision Research", In Repository of arXiv:2008.11239v1, Aug. 25, 2020, 7 Pages.

Vaswani, et al., "Attention is All You Need", In Proceedings of Advances in Neural Information Processing Systems, vol. 30, Dec. 4, 2017, 11 Pages.

Winkler, et al., "QuestSim: Human Motion Tracking from Sparse Sensors with Simulated Avatars", In Repository of arXiv:2209.09391v1, Sep. 20, 2022, 9 Pages.

Yang, et al., "LoBSTr: Real-time Lower-Body Pose Prediction from Sparse Upper-body Tracking Signals", In Proceedings of Computer Graphics Forum, vol. 40, No. 2, May 2021, pp. 265-275.

Yi, et al., "Physical Inertial Poser (PIP): Physics-Aware Real-Time Human Motion Tracking from Sparse Inertial Sensors", In Proceedings of the IEEE/CVF Conference on Computer Vision and Pattern Recognition, Jun. 19, 2022, pp. 13167-13178.

Yi, et al., "TransPose: Real-Time 3D Human Translation and Pose Estimation with Six Inertial Sensors", In Journal of ACM Transactions on Graphics, vol. 40, No. 4, Article 86, Aug. 2021, 13 Pages.

Zanfir, et al., "THUNDR: Transformer-Based 3D Human Reconstruction with Markers", In Repository of arXiv:2106.09336v1, Jun. 17, 2021, 11 Pages.

Zanfir, et al., "Weakly Supervised 3D Human Pose and Shape Reconstruction with Normalizing Flows", In Proceedings of 16th European Conference on Computer Vision, Aug. 23, 2020, pp. 465-481.

Zhang, et al., "We are More than Our Joints: Predicting how 3D Bodies Move", In Proceedings of the IEEE/CVF conference on Computer Vision and Pattern Recognition (CVPR), Jun. 19, 2021, pp. 3372-3382.

Zhou, et al., "On the Continuity of Rotation Representations in Neural Networks" In Proceedings of the IEEE/CVF Conference on Computer Vision and Pattern Recognition, Jun. 16, 2019, pp. 5745-5753.

International Preliminary Report on Patentability received for PCT Application No. PCT/US2024/013619, mailed on Aug. 14, 2025, 09 pages.

(56) References Cited

OTHER PUBLICATIONS

International Search Report and Written Opinion received for PCT Application No. PCT/US2024/013619, May 24, 2024, 14 pages.
Jiang, et al., "A Dual-Masked Auto-Encoder for Robust Motion Capture with Spatial-Temporal Skeletal Token Completion", In Proceedings of the 45th international ACM SIGIR conference on research and development in information retrieval, Oct. 10, 2022, pp. 5123-5131.
Yuan, et al., "GLAMR: Global Occlusion-Aware Human Mesh Recovery with Dynamic Cameras", IEEE/CVF Conference on computer vision and pattern recognition (CVPR), Jun. 18, 2022, pp. 11028-11039.
Zou, et al., "Snipper: A Spatiotemporal Transformer for Simultaneous multi-Person 3D Pose Estimation Tracking and Forecasting on a Video Snippet", In Repository of arXiv:2207.04320, Jul. 9, 2022, 15 Pages.
Non-Final Office Action mailed on Jun. 23, 2025, in U.S. Appl. No. 18/164,391 16 Pages.
Notice of Allowance mailed on Dec. 23, 2025, in U.S. Appl. No. 18/164,391 5 Pages.

* cited by examiner

UPDATING POSE OF AN ARTICULATED OBJECT

CROSS-REFERENCE TO RELATED APPLICATION

This application is a continuation-in-part application of and claims priority to U.S. patent application Ser. No. 18/164,391, entitled "PREDICTING BODY MOTION," filed on Feb. 3, 2023, the disclosure of which is incorporated herein by reference in its entirety.

BACKGROUND

Articulated objects such as the human body, motor vehicles, laptop computers, animals and other articulated objects are often represented in computer processes by storing poses of joints of a kinematic tree. A kinematic tree is a plurality of joints connected together by rigid bodies such as bones of a skeleton or parts of a motor vehicle. A pose of the articulated entity may be recorded by recoding a pose (position and orientation) of each of the joints of the kinematic tree. Updating the pose in the light of sensor data about the articulated object is not straightforward.

The embodiments described below are not limited to implementations which solve any or all of the disadvantages of known ways of updating pose of an articulated object.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Updating a pose of an articulated object using a kinematic tree is useful for a variety of purposes including but not limited to: animating avatars, completing the pose of a full human body when only part of the pose is visible, full body pose estimation using signals from inertial measurement units worn only on wrists and ankles.

A method of updating a pose of a plurality of joints of a kinematic tree of an articulated object is described. The method comprises receiving, for each of the joints in the kinematic tree, an initial pose. A single first embedding vector is computed by encoding the initial poses in an embedding space. For each of some but not all of the joints in the kinematic tree, a target pose is received. A single second embedding vector representing the target poses is computed in the embedding space. The first embedding vector is modified using the second embedding vector to form a third embedding vector. Decoding the third embedding vector produces the updated pose of the articulated object.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

As mentioned above, updating the pose of an articulated object in the light of sensor data about the object (which may be sparse) is difficult. One approach is to use inverse kinematics. Inverse kinematics is where the pose of one or more end effectors of a kinematic tree are known, and it is desired to update the rest of the kinematic tree to be consistent with the pose of the end effectors. An end effector is a leaf node of a kinematic tree, such as an ankle or wrist in the case of a human skeleton. One of the reasons that inverse kinematics is difficult is that there are constraints on how the articulated entity can be arranged and these constraints are difficult and complex to express mathematically using rules. In an example, where the kinematic tree is a human skeleton, the constraints include things like, the foot cannot go behind the back. Traditional methods for solving inverse kinematics problems often involve complex mathematical formulations or require artists and specialized riggers involvement to create rigs (where a rig is a set of constraints and relationships between different parts of an object, such as wrist can only bend in particular ways and palm cannot intersect with fingers) that inverse kinematics can work on to achieve natural looking and plausible poses, and may not always guarantee optimal or real-time solutions.

The present technology presents an innovative deep learning based approach to approximating inverse kinematics for real time and accurate pose manipulation. By harnessing the power of a neural network with attention mechanism, neural networks can efficiently and accurately estimate joint angles given an arbitrary number of target joint positions and rotations. A novel data augmentation regime is described to create training data for training the neural network. The resulting system can seamlessly be utilized as a real time inverse kinematics solution that enables non-artists to be able to manipulate poses. It also enables other tasks such as motion generation driven by wearable devices.

Figure 1:
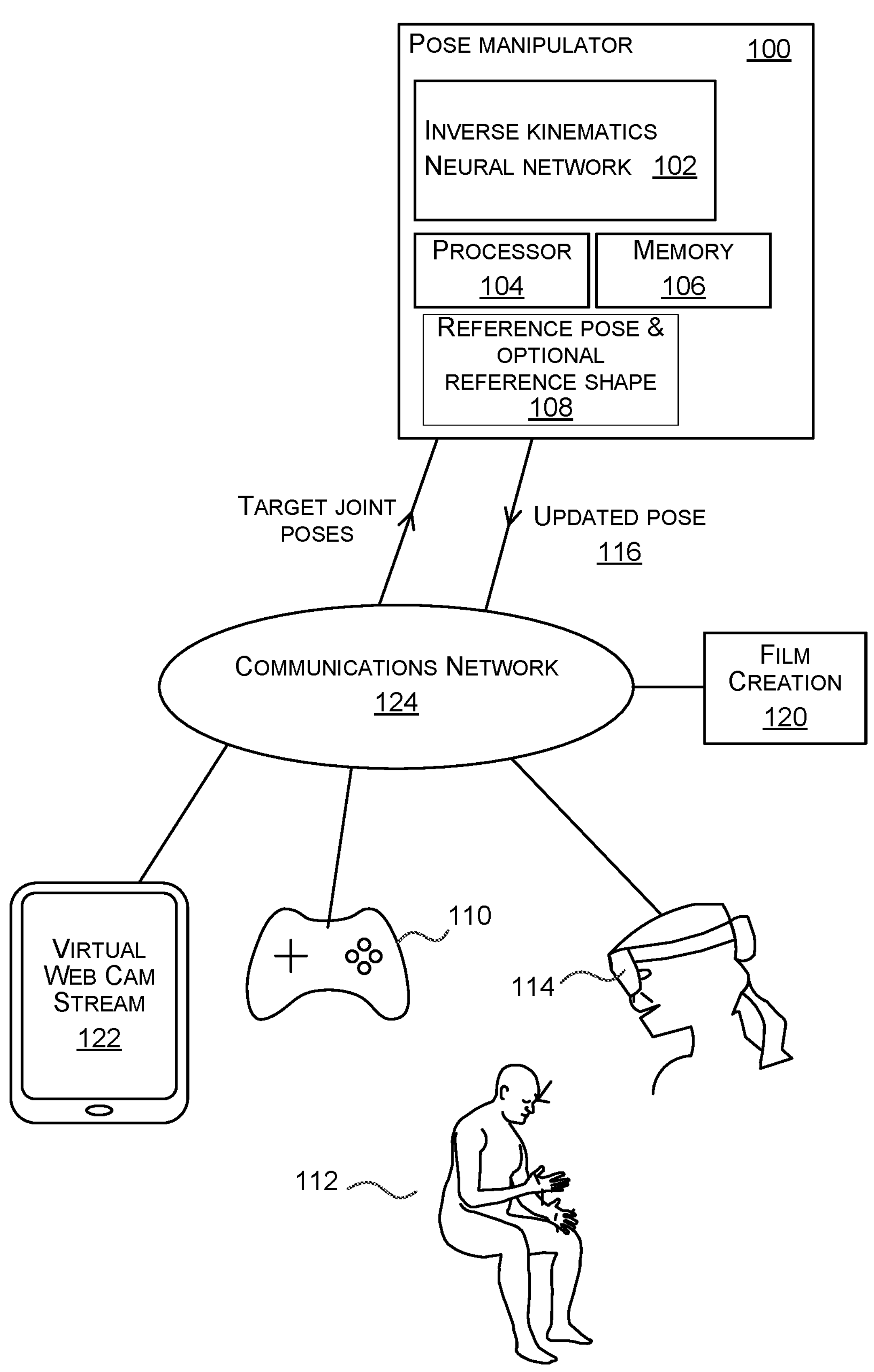
FIG. 1 shows a pose manipulator deployed as a cloud service.

FIG. 1 is a schematic diagram of a pose manipulator 100 deployed in the cloud. The pose manipulator is for use with one class or type of kinematic tree, such as a human body, or a motor vehicle. It is computer implemented and comprises an inverse kinematics neural network 102, a processor 104, a memory 106, and an initial pose and optional reference shape 108. The pose manipulator 100 receives as input one or more target joint poses. It returns an updated pose 116 of all the joints in the kinematic tree.

The pose manipulator 100 receives the target poses via communications network 124 from a client device. A non-exhaustive list of types of client device which may be used is: game console 110, smart phone 122, head worn computer 114, file creation tool 120. Each target pose is a 3D position and 3D orientation (6 degree of freedom pose). The updated pose is a 3D position and 3D orientation for each joint of the kinematic tree. In some examples the updated pose of the articulated object is an approximation of inverse kinematics applied to the kinematic tree using the target poses.

It is not essential for the pose manipulator 100 to be deployed as a cloud service. In some cases the pose manipulator is functionality deployed in an end user computing device such as a smart phone, laptop computer, wearable computer or desktop computer. The functionality of the pose manipulator 100 is distributed between more than one entity in some cases.

The pose manipulator updates a pose of a plurality of joints of a kinematic tree of an articulated object. This is useful for a variety of purposes such as film creation, avatar manipulation, full body pose estimation from sparse sensor data and more. The method comprises receiving, for each of the joints in the kinematic tree, an initial pose. Having an initial pose gives the method something to start from. The initial pose is not only to have a place to start from (e.g. the method could start from fully neutral standing pose with arms down by the hips), but also to constrain the end outcome. In some examples it is desired for the end pose to be like the start pose with exception that a joint position is changed, such as a hand is raised for example. The method computes a single first embedding vector by encoding the initial poses in an embedding space. The first embedding vector is a concise and hence efficient way to represent the initial poses. For each of some but not all of the joints in the kinematic tree, a target pose is received. The method is able to receive the target pose from user input or from sensor data or from another computing process. The method computes a single second embedding vector representing the target poses in the embedding space. The second embedding vector is a concise representation which improves efficiency. The process comprises modifying the first embedding vector using the second embedding vector to form a third embedding vector. Because the first and second embedding vectors are in the same space it is possible to modify the first embedding vector (representing the initial poses) in the light of the target poses (second embedding vector). This provides a convenient and effective way to update the pose that gives accurate results which are plausible (agree with ways the articulated entity can be manipulated naturally). There is no need to use complex rules to express constraints. The method decodes the third embedding vector to produce the updated pose of the articulated object. The third embedding vector is a concise representation that can be sent with low bandwidth. It can be decoded to produce the position and orientation values for each of the joints in the kinematic tree.

Being able to encode the initial poses and the target poses into the same embedding space enables the target poses to be used to update the initial poses in an efficient and effective manner.

The inverse kinematics neural network improves the functioning of the underlying computing device by enabling target poses to be used to update initial poses in an efficient and effective manner.

Alternatively, or in addition, the functionality of the pose manipulator described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The task of the pose manipulator 100 is to generate a novel pose y given an initial pose x and an arbitrary number of targets T=[j1, j2 . . . ] such that the novel pose is a modified version of the initial pose that closely matches the targets. The poses x and y are defined with joint rotations of joints in the body kinematic tree. Each target is a 6-DoF representation of an end-effector joint (i.e., the leaves of the kinematic tree).

Figure 2:
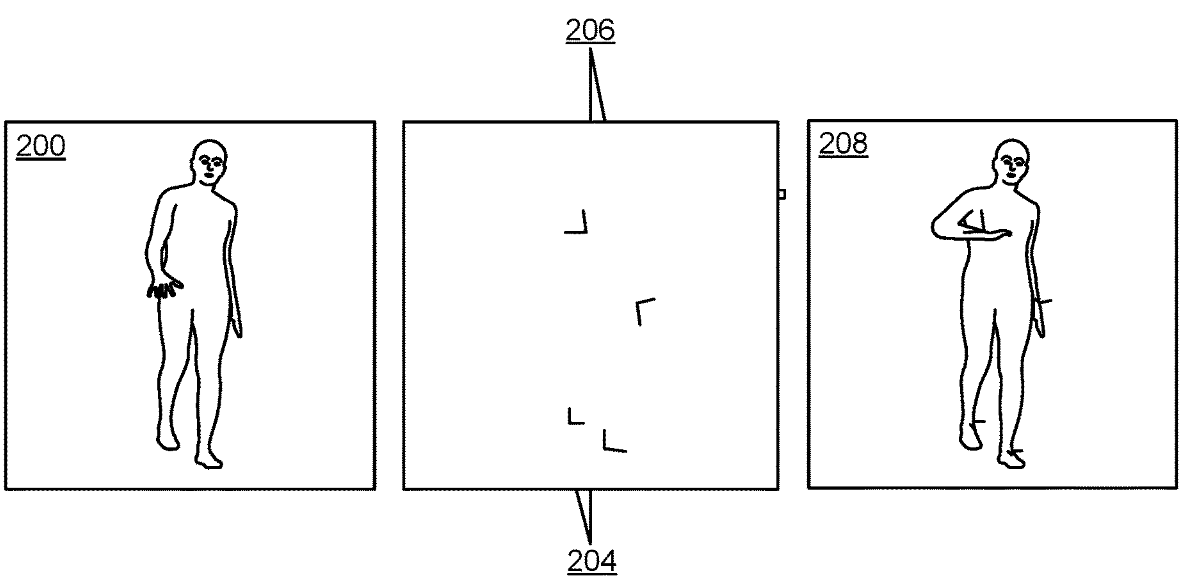
FIG. 2 shows an initial pose of a kinematic tree, target poses of four joints, and an updated pose of the kinematic tree.

FIG. 2 shows an initial pose 200 of a kinematic tree (also referred to as a reference pose), target poses of four joints 204, 206, and an updated pose 208 of the kinematic tree. The initial pose is a standing human body. The target poses are poses of ankle joints and wrist joints of the human body where only the right wrist has moved as compared to the initial pose 200. The updated pose 208 shows the standing human body with the right hand raised and the right arm and shoulder pose adjusted to agree and where the rest of the joints of the body are unchanged.

Figure 3:
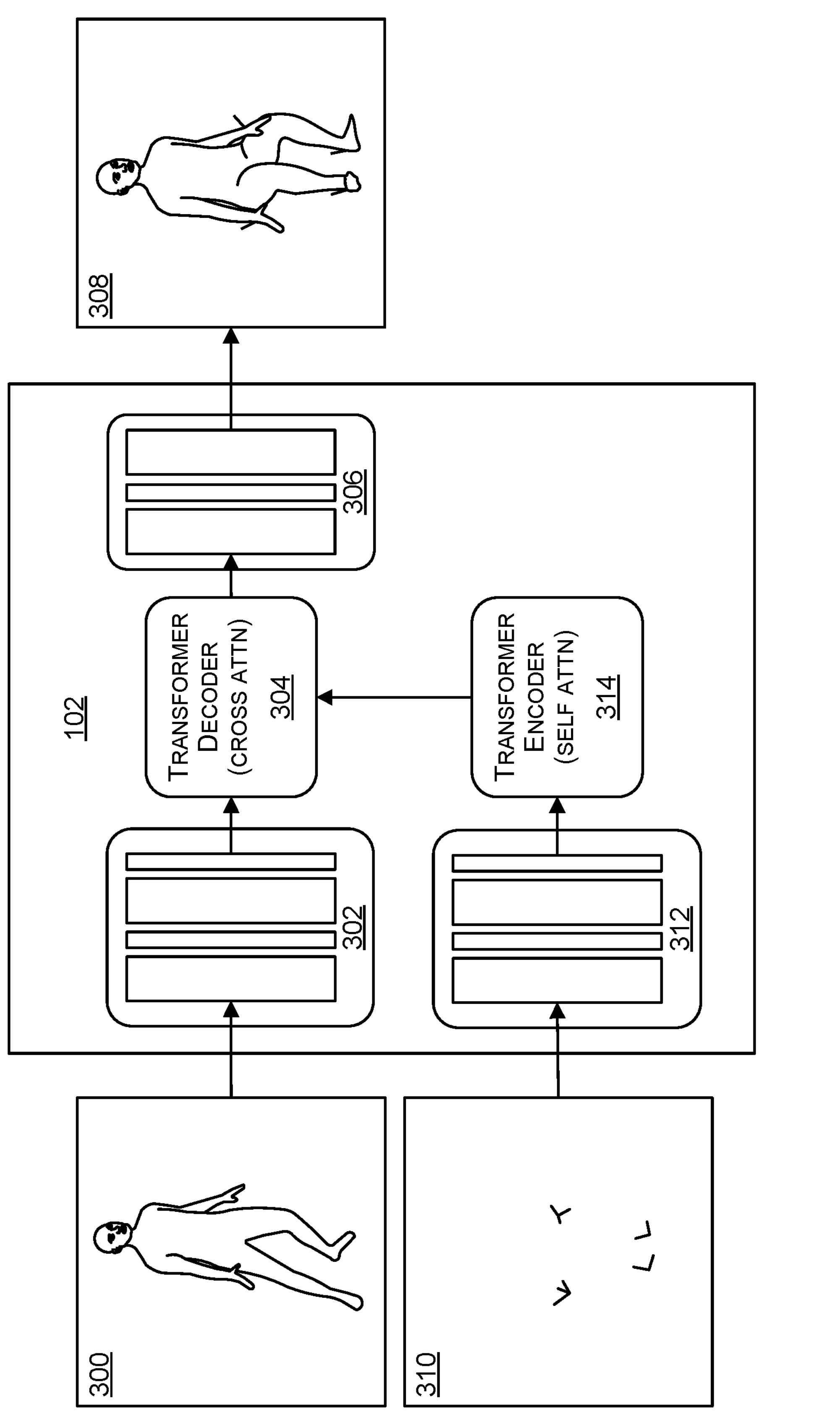
FIG. 3 shows an architecture of an example inverse kinematics neural network.

FIG. 3 shows an architecture of an example inverse kinematics neural network 102. It comprises a first encoder 302, a second encoder 312, a decoder 306 and a transformer comprising a transformer encoder 314 and a transformer decoder 304. In this example the architecture comprises five components, all trained end-to-end: an initial pose embedding module (the first encoder 302), a target embedding module (the second encoder 312), a self-attention mechanism (the transformer encoder 314) to learn the relation between various components of the target signal, a cross-attention module (the transformer decoder 304) to learn how to manipulate the initial pose given the target signal, and finally a pose decoder (decoder 306) to generate the resulting pose.

The first encoder 302 computes an embedding representation of the initial pose that is then consumable by the transformer decoder 304 (cross-attention module). The first encoder receives as input the initial pose 300, where the pose global orientation is considered fixed. The pose is defined as the local rotation of all joints in the body, each represented relative to its parent according to the kinematic tree of human skeleton. This is a standard representation of the human pose. For a pose of N joints, each joint is represented with the 6D rotation representation, resulting a N×6 tensor. Along with this representation, additionally provide the global rotation and position of each joint. This is achieved by computing the forward kinematics (FK) on the given pose. Similar to local pose, the global rotation of each joint is also represented in 6D and the positions are represented in 3D coordinate system, where the root join is positioned at the center of coordinate system facing forward. Combined together, the input to the first encoder 302 is a tensor of N×(6+6+3) for a single input pose. The first encoder is based on a multi-layer perceptron (MLP), acting on each joint's representation independently and in parallel. It aims at computing the embedding representation in a d dimensional embedding space.

The second encoder 312 computes an embedding representation of the target poses that is then consumable by the transformer encoder 314. The second encoder 312 receives as input the 6-DoF representation (position and rotation) of an arbitrary number of target joints 310. The number of target joints could be between 1 and the number of end effector joints (NEE). Similar to the first encoder, here the rotations are represented in 6D and positions are in 3D. Thus each target 6-DoF is represented as a 9D input. The second encoder is based on a multi-layer perceptron (MLP), acting on each joint's representation independently and in parallel. It aims at computing the embedding representation in a d dimensional embedding space. Note that, the model is trained only once and can be used for any subset of target joints.

The transformer encoder 314 learn the relation between different target poses. Unlike the initial pose representation in which each joint is represented relative to its parent in the body kinematic tree, and thus are strongly related to each other, target joints are represented globally and independently. Thus, it is of crucial importance to learn how they correlate and what potential poses they may represent. To this end, explicitly learn the relation between different target signals. For this purpose, use a transformer encoder 314 which utilizes a self-attention mechanism. The benefit of such design choice is two-fold: (1) to effectively transform each joint's embedding such that the resulting feature vector contains information about all other joints in relation to it, and (2) to effectively handle arbitrary number of input target joints by design. The resulting features are more expressive representation of target joints in an embedding space of similar dimension.

The transformer decoder 304 learns the cross-attention between the target joints' representations and that of the initial pose. Once expressive representation of the target joints are achieved, it is possible to learn how to modify the initial pose such that the resulting pose matches the target. This requires learning to attend to different parts of the initial pose to be able to change the pose of different body parts. This is achieved by explicitly learning the cross-attention between the target joints' representations and that of the initial pose. A transformer decoder 304 layer (which inherently utilizes cross-attention), learn how to translate the initial pose to a novel pose such that (1) if the target joint indicates changing a body part of the initial pose, it is reflected in the resulting representation, and (2) if it does not indicate a change in the initial pose, the initial pose representation remains unchanged.

In an example, modifying the first embedding vector using the second embedding vector comprises concatenating the first embedding vector and the second embedding vector to form a concatenated embedding vector and decoding the concatenated embedding vector using a decoder neural network.

The decoder 306 is used to decode the transformed embedding vector into the updated pose. Once the transformer decoder 304 computes the features, they serve as the input to a multi-layer perceptron (MLP) 306 that transforms the d dimensional feature representation of each joint to a 6D rotation representation, constructing a novel pose.

The architecture of FIG. 3 is modified in some examples as now explained.

In some cases shape parameters are used in addition to poses of the joints of the kinematic tree. The shape parameters are shape parameters of body parts of the kinematic tree. The shape parameters are concatenated to the inputs to the encoders and the architecture is the same except that the sizes of the embedding vectors may be larger since shape also has to be taken into account. Using shape parameters is particularly beneficial for human body pose estimation where body shape influences poses which are plausible.

The first embedding vector is in a multi-dimensional space and the second embedding vector is in the same multi-dimensional space. This is achieved either by end-to-end training of the neural network or by using the same encoder to produce the first and second embedding vectors.

Figure 4:
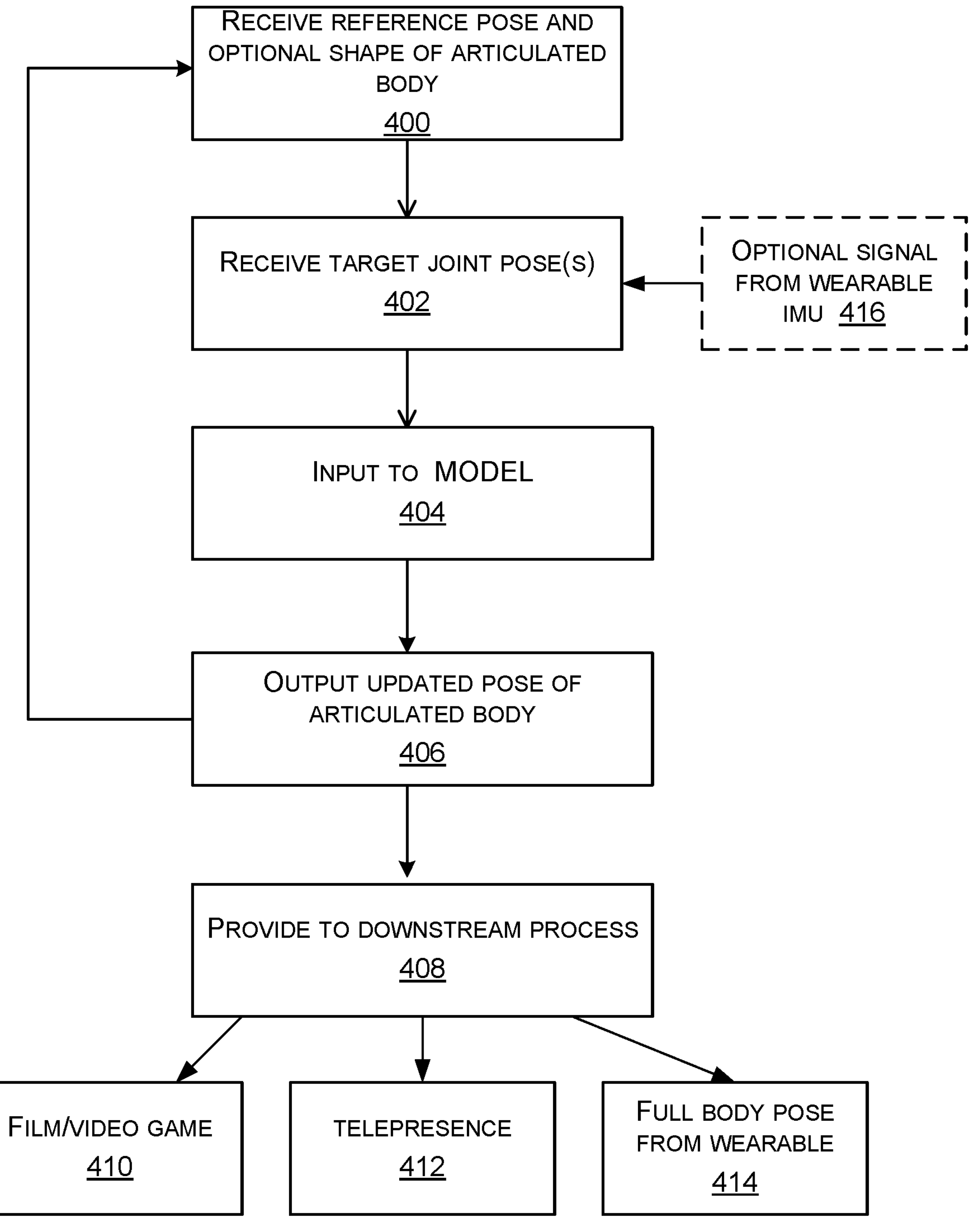
FIG. 4 is a flow diagram of a method of updating a pose using a pose manipulator such as that of FIG. 1 or 3.

FIG. 4 is a flow diagram of a method of updating a pose using a pose manipulator such as that of FIG. 1 or 3. An initial pose and optional shape parameter values of an articulated body is received 400. Target joint poses are received 402. Optionally the target joint poses are received from a wearable inertial measurement unit IMU signal. In some examples the target joint poses are received 402 from a graphical user interface where a user drags and drops an icon or uses another user interface tool to specify the target joint poses.

The target joint poses and the initial poses are input 404 to the model (the inverse kinematics neural network of FIG. 3) which outputs 406 an update pose of the articulated body. The process optionally repeats from operation 400. The updated pose is provided 408 to a downstream process such as a film or video game 410, a telepresence application 412, a full body pose from wearable head mounted display HMD application.

Figure 5:
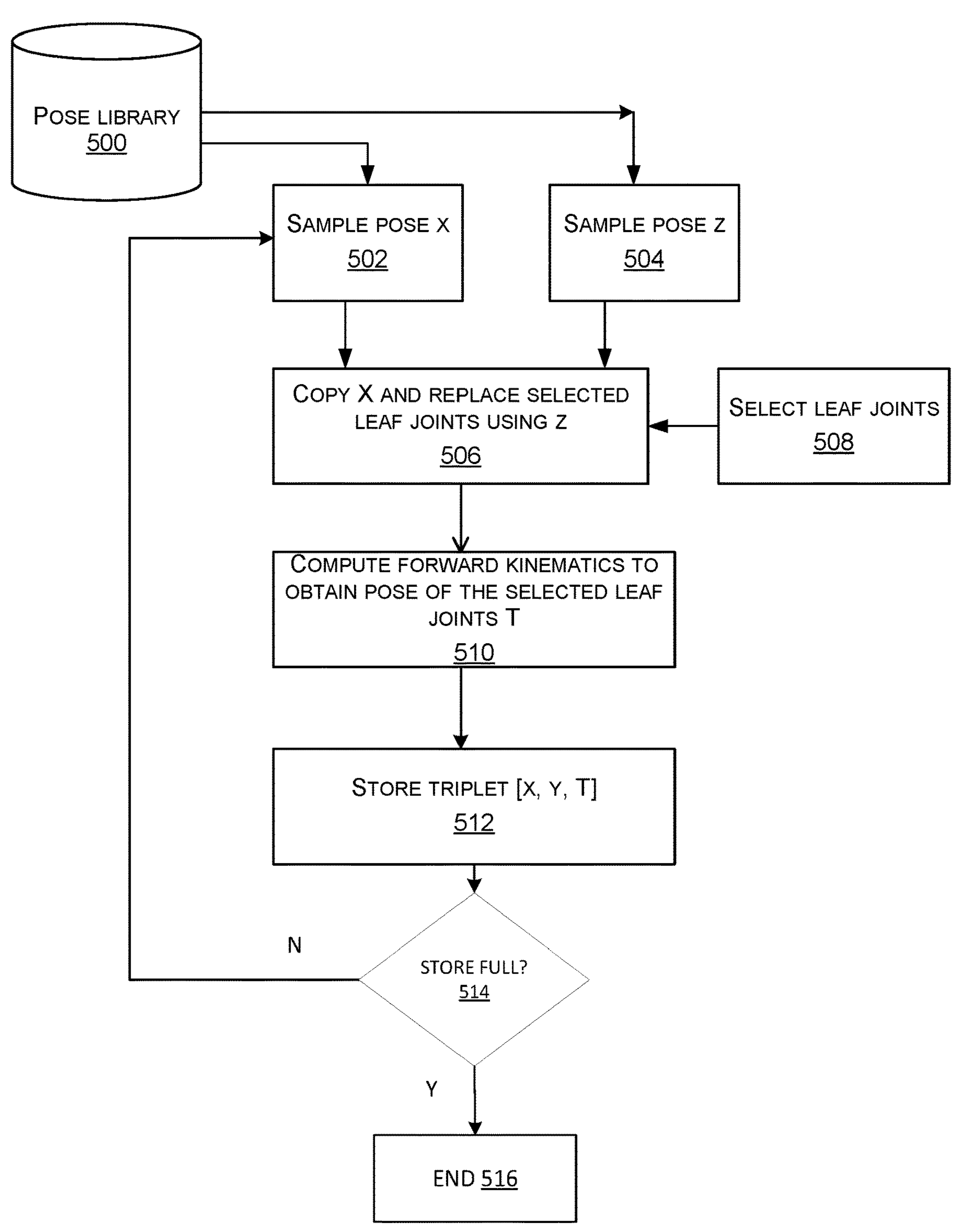
FIG. 5 is a flow diagram of a method of creating training data to train a pose manipulator.

FIG. 5 is a flow diagram of a method of creating training data to train a pose manipulator such as that of FIG. 1. A library 500 of poses of the type of articulated entity is available. In the case of human body pose this is a library of human body poses. In the case of a motor vehicle this is a library of poses of motor vehicles. To prepare a sample to train the inverse kinematics neural network, two poses are sampled from the library 500, such as by random sampling or other sampling methods. This gives sample pose x 502 and sample pose z 504. Then normalize each pose such that (1) the root appears in the center of the coordinate system, and (2) the root of the pose, (i.e., the pelvis in the case of a human body), is facing forward. With that, the two poses are globally originated similarly. Since the pose constructed as a kinematic tree, once can replace part of the kinematic tree of a pose that leads to a leaf node with that of another pose. For instance, if one defines the left arm as left shoulder, elbow; and wrist, it is possible to replace these joints' rotations with same joints rotations of another pose, resulting in a new pose where everything except for the left arm is identical to the original pose. The same process is possible for any part of the kinematic tree. As illustrated in FIG. 5 randomly sample a pose from pose library 500 to serve as x. Randomly sample another pose z that is different from x. Randomly select 508 one or more body parts leading to a subset of leaf joints. Create a new pose y by copying 506 x and replacing the sampled body part from z. Compute 510 forward kinematics to come up with the 6-DoF of the modified leaf joints, resulting in the target T.

This results in the triplet [x, y, T]. Store 512 the triplet and check if there are enough triplets in the store. If the store is not yet full repeat the process. Otherwise end 516.

Figure 6:
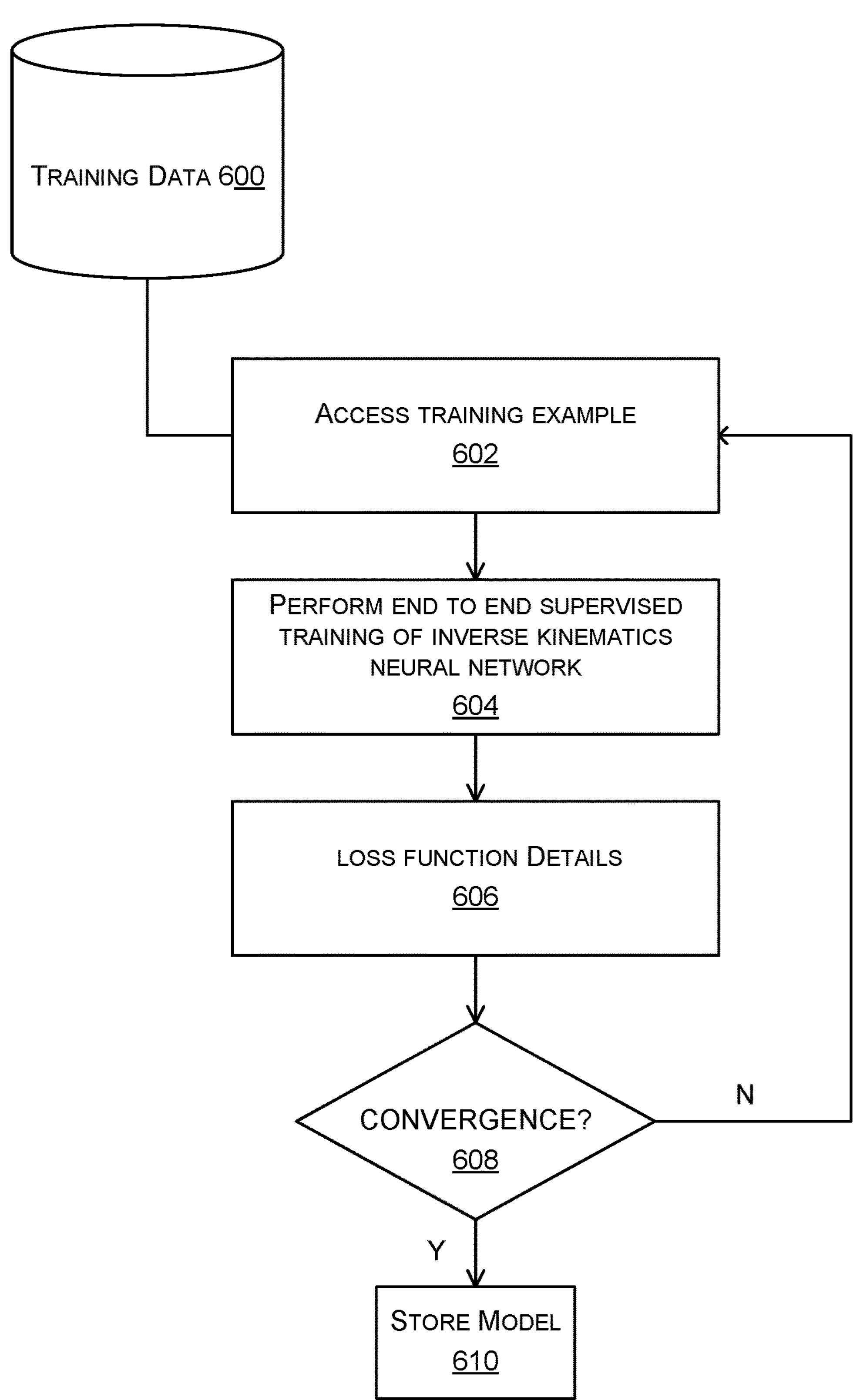
FIG. 6 is a flow diagram of a method of training a pose manipulator.

FIG. 6 is a flow diagram of a method of training a pose manipulator. The process comprises accessing training data 600 where the training data comprises triplets as explained with reference to FIG. 5. A training example is accessed 602 and end to end supervised training 604 is carried out on the inverse kinematics neural network. The training uses back-propagation with a loss function 606 as explained below. If convergence is reached (where the neural network weights change only a very small amount in a training iteration) the training ends and the model is stored 610. If convergence is not reached at check 608 the process repeats from operation 602 for another training example.

To optimize the parameters of the model, the following loss function may be used, encouraging the model to predict a pose that is close to y, given x and T.

$$L = L_{local} + L_{world} + L_{EE}$$

The first term, $L_{local}$, is the reconstruction loss between the direct prediction of the model and y. The second term, $L_{world}$, is the reconstruction loss between the prediction of the model and y in the world coordinates after computing forward kinematics on both poses. Finally, LEE, is the reconstruction loss between the 6-DoFs of the predicted end effectors and T. All reconstruction losses are LI loss.

The inverse kinematics neural network of FIG. 3 was tested empirically. The Euclidean distance between the generated poses end effector 6-DoFs and that of the target signal were computed. For the left wrist the error was 3.2 cm, for the right wrist 3.17 cm for the left ankle 3.15 cm, for the right ankle 3.16 cm.

Figure 7:
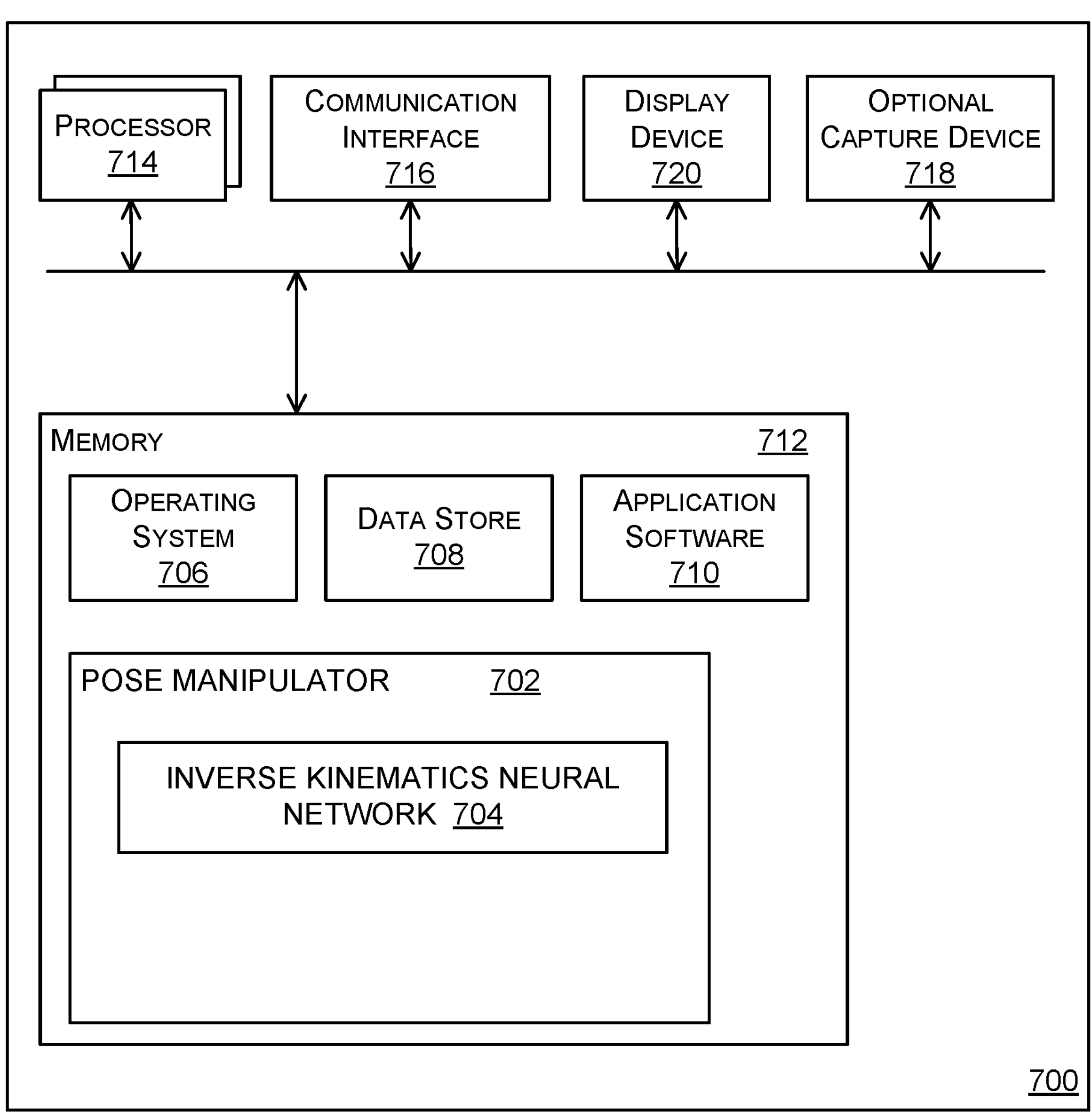
FIG. 7 illustrates an exemplary computing-based device in which examples of a pose manipulator are implemented.

FIG. 7 illustrates various components of an exemplary computing-based device 700 which are implemented as any form of a computing and/or electronic device (such as a smart phone, HMD, self-driving vehicle, laptop computer, data center compute node), and in which examples of a pose manipulator are implemented in some examples.

Computing-based device 700 comprises one or more processors 714 which are microprocessors, controllers or any other suitable type of processors for processing computer executable instructions to control the operation of the device in order to manipulate the pose of an articulated entity having a kinematic tree. In some examples, for example where a system on a chip architecture is used, the processors 714 include one or more fixed function blocks (also referred to as accelerators) which implement a part of the method of any of FIGS. 4 to 6 in hardware (rather than software or firmware). A pose manipulator 702 is deployed in the computing-based device 700 and comprises an inverse kinematics neural network 704. Platform software comprising an operating system 706 or any other suitable platform software is provided at the computing-based device to enable application software 710 to be executed on the device. Data store 708 holds poses, kinematic trees, shape parameters or other data.

The computer executable instructions are provided using any computer-readable media that is accessible by computing based device 700. Computer-readable media includes, for example, computer storage media such as memory 712 and communications media. Computer storage media, such as memory 712, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 712) is shown within the computing-based device 700 it will be appreciated that the storage is, in some examples, distributed or located remotely and accessed via a network or other communication link (e.g. using communication interface 716).

The computing-based device optionally has a display device 720. The display information may provide a graphical user interface. The computing-based device optionally has a capture device 718 such as for capturing inertial measurement unit IMU signals or other data.

Alternatively or in addition to the other examples described herein, examples include any combination of the following clauses:

Clause A. A computer-implemented method of updating a pose of a plurality of joints of a kinematic tree of an articulated object, the method comprising:

- receiving, for each of the joints in the kinematic tree, an initial pose;
- computing a single first embedding vector by encoding the initial poses in an embedding space;
- for each of some but not all of the joints in the kinematic tree, receiving a target pose;
- computing a single second embedding vector representing the target poses in the embedding space;
- modifying the first embedding vector using the second embedding vector to form a third embedding vector;
- decoding the third embedding vector to produce the updated pose of the articulated object.

Clause B. The method of clause A wherein the updated pose of the articulated object is an approximation of inverse kinematics applied to the kinematic tree using the target poses.

Clause C. The method of clause A or clause B wherein computing the first embedding vector comprises:

- concatenating the initial poses; and
- using a first encoder neural network to encode the concatenated initial poses producing the first embedding vector.

Clause D. The method of any preceding clause wherein computing the second embedding vector comprises concatenating the target poses and using a second encoder neural network to encode the concatenated target poses.

Clause E. The method of clause D wherein the second encoder neural network is different from the first encoder neural network.

Clause F. The method of clause C wherein the first encoder neural network is a multi-layer perceptron.

Clause G. The method of clause D wherein the second encoder neural network is a multi-layer perceptron.

Clause H. The method of any preceding clause wherein the first embedding vector is in a multi-dimensional space and the second embedding vector is in the same multi-dimensional space.

Clause I. The method of any preceding clause wherein modifying the first embedding vector using the second embedding vector comprises concatenating the first embedding vector and the second embedding vector to form a concatenated embedding vector and decoding the concatenated embedding vector using a decoder neural network.

Clause J. The method of clause I wherein the decoder neural network comprises a transformer neural network.

Clause K. The method of clause I wherein the decoder neural network comprises a transformer neural network and a decoder neural network.

Clause L. The method of any preceding clause comprising applying self-attention to the first embedding vector using a transformer neural network prior to using the first embedding vector to modify the second embedding vector.

Clause M. The method of any preceding clause comprising applying cross attention to the first embedding vector and the second embedding vector using a transformer neural network.

Clause N. The method of any preceding clause comprising receiving values of shape parameters of the articulated object and computing the first embedding vector by encoding both the initial poses and the shape parameter values such that the updated pose of the articulated object takes into account the shape parameter values.

Clause O. The method of any preceding clause comprising using neural networks to compute the first embedding vector, the second embedding vector and the third embedding vector and to decode the third embedding vector, where the neural networks are trained end-to-end using supervised learning.

Clause P. The method of clause O comprising carrying out the supervised learning using training examples, each training example comprising a triplet X, Y, T where X is first pose of the kinematic tree of the articulated object, Y is a second pose of the kinematic tree of the articulated object created by copying X and replacing one or more leaf joints of X using Z, where Z is another pose of the kinematic tree of the articulated object, and where T is the pose of the replaced leaf joints computed using forward kinematics.

Clause Q. The method of any preceding clause comprising presenting the kinematic tree of the initial pose in a graphical user interface and receiving user input moving a leaf joint to specify a target pose.

Clause R. The method of any preceding clause comprising using the updated pose of the articulated object for any of: enabling a non-artist to update pose of an avatar, task-specific pose augmentation, augmenting an upper body motion by modifying lower body pose or vice versa, full body pose estimation given signals from a wearable device, full body pose estimation from inertial measurement unit sensors worn only on wrists and ankles.

Clause S. A computer storage medium having computer-executable instructions that, when executed by a computing system, direct the computing system to perform operations comprising:

receiving, for each of the joints in the kinematic tree, an initial pose;

computing a single first embedding vector by encoding the initial poses in an embedding space;

for each of some but not all of the joints in the kinematic tree, receiving a target pose;

computing a single second embedding vector representing the target poses in the embedding space;

modifying the first embedding vector using the second embedding vector to form a third embedding vector, by using a transformer neural network;

decoding the third embedding vector to produce the updated pose of the articulated object.

Clause T. An apparatus comprising:

a processor;

a memory storing instructions that, when executed by the processor, perform a method, comprising:

receiving, for each of the joints in the kinematic tree, an initial pose;

computing a single first embedding vector by encoding the initial poses;

for each of some but not all of the joints in the kinematic tree, receiving a target pose;

computing a single second embedding vector representing the target poses;

modifying the first embedding vector using the second embedding vector to form a third embedding vector;

decoding the third embedding vector to produce the updated pose of the articulated object.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method of updating a pose of a plurality of joints of a kinematic tree of an articulated object, the method comprising:

receiving, for each of the joints in the kinematic tree, an initial pose;

computing a single first embedding vector by encoding the initial poses in an embedding space;

for each of some but not all of the joints in the kinematic tree, receiving a target pose;

computing a single second embedding vector representing the target poses in the embedding space;

modifying the first embedding vector using the second embedding vector to form a third embedding vector;

decoding the third embedding vector to produce the updated pose of the articulated object.

2. The method of claim 1 wherein the updated pose of the articulated object is an approximation of inverse kinematics applied to the kinematic tree using the target poses.

3. The method of claim 1 wherein computing the first embedding vector comprises:

concatenating the initial poses; and using a first encoder neural network to encode the concatenated initial poses producing the first embedding vector.

4. The method of claim 3 wherein the first encoder neural network is a multi- layer perceptron.

5. The method of claim 3 wherein computing the second embedding vector comprises concatenating the target poses and using a second encoder neural network to encode the concatenated target poses.

6. The method of claim 5 wherein the second encoder neural network is different from the first encoder neural network.

7. The method of claim 5 wherein the second encoder neural network is a multi-layer perceptron.

8. The method of claim 1 wherein the first embedding vector is in a multi-dimensional space and the second embedding vector is in the same multi-dimensional space.

9. The method of claim 1 wherein modifying the first embedding vector using the second embedding vector comprises concatenating the first embedding vector and the second embedding vector to form a concatenated embedding vector and decoding the concatenated embedding vector using a decoder neural network.

10. The method of claim 9 wherein the decoder neural network comprises a transformer neural network.

11. The method of claim 9 wherein the decoder neural network comprises a transformer neural network and a decoder neural network.

12. The method of claim 1 comprising applying self-attention to the second embedding vector using a transformer neural network prior to using the first embedding vector to modify the second embedding vector.

13. The method of claim 1 comprising applying cross attention to the first embedding vector and the second embedding vector using a transformer neural network.

14. The method of claim 1 comprising receiving values of shape parameters of the articulated object and computing the first embedding vector by encoding both the initial poses and the values of the shape parameters such that the updated pose of the articulated object takes into account the values of the shape parameters.

15. The method of claim 1 comprising using neural networks to compute the first embedding vector, the second embedding vector and the third embedding vector and to decode the third embedding vector, where the neural networks are trained end-to-end using supervised learning.

16. The method of claim 15 comprising carrying out the supervised learning using training examples, each training example comprising a triplet X, Y, T where X is first pose of the kinematic tree of the articulated object, Y is a second pose of the kinematic tree of the articulated object created by copying X and replacing one or more leaf joints of X using Z, where Z is another pose of the kinematic tree of the articulated object, and where T is the pose of replaced leaf joints computed using forward kinematics.

17. The method of claim 1 comprising presenting the kinematic tree of the initial pose in a graphical user interface and receiving user input to specify the target pose.

18. The method of claim 1 comprising using the updated pose of the articulated object for any of: enabling a non-artist to update pose of an avatar, task-specific pose augmentation, augmenting an upper body motion by modifying lower body pose or vice versa, full body pose estimation given signals from a wearable device, full body pose estimation from inertial measurement unit sensors worn only on wrists and ankles.

19. A computer storage medium having computer-executable instructions that, when executed by a computing system, direct the computing system to perform operations for updating a pose of a plurality of joints of a kinematic tree of an articulated object, the operations comprising:

receiving, for each of the joints in the kinematic tree, an initial pose;

computing a single first embedding vector by encoding the initial poses in an embedding space;

for each of some but not all of the joints in the kinematic tree, receiving a target pose;

computing a single second embedding vector representing the target poses in the embedding space;

modifying the first embedding vector using the second embedding vector to form a third embedding vector, by using a transformer neural network; and decoding the third embedding vector to produce the updated pose of the articulated object.

20. An apparatus comprising:

a processor; and a memory storing instructions that, when executed by the processor, perform a method of updating a pose of a plurality of joints of a kinematic tree of an articulated object, the method comprising:

receiving, for each of the joints in the kinematic tree, an initial pose;

computing a single first embedding vector by encoding the initial poses;

for each of some but not all of the joints in the kinematic tree, receiving a target pose;

computing a single second embedding vector representing the target poses;

modifying the first embedding vector using the second embedding vector to form a third embedding vector; and decoding the third embedding vector to produce the updated pose of the articulated object.

* * * * *